W. D. INSKO.
BROODER.
APPLICATION FILED OCT. 17, 1919.
1,350,971.
Patented Aug. 24, 1920.
5 SHEETS—SHEET 2.
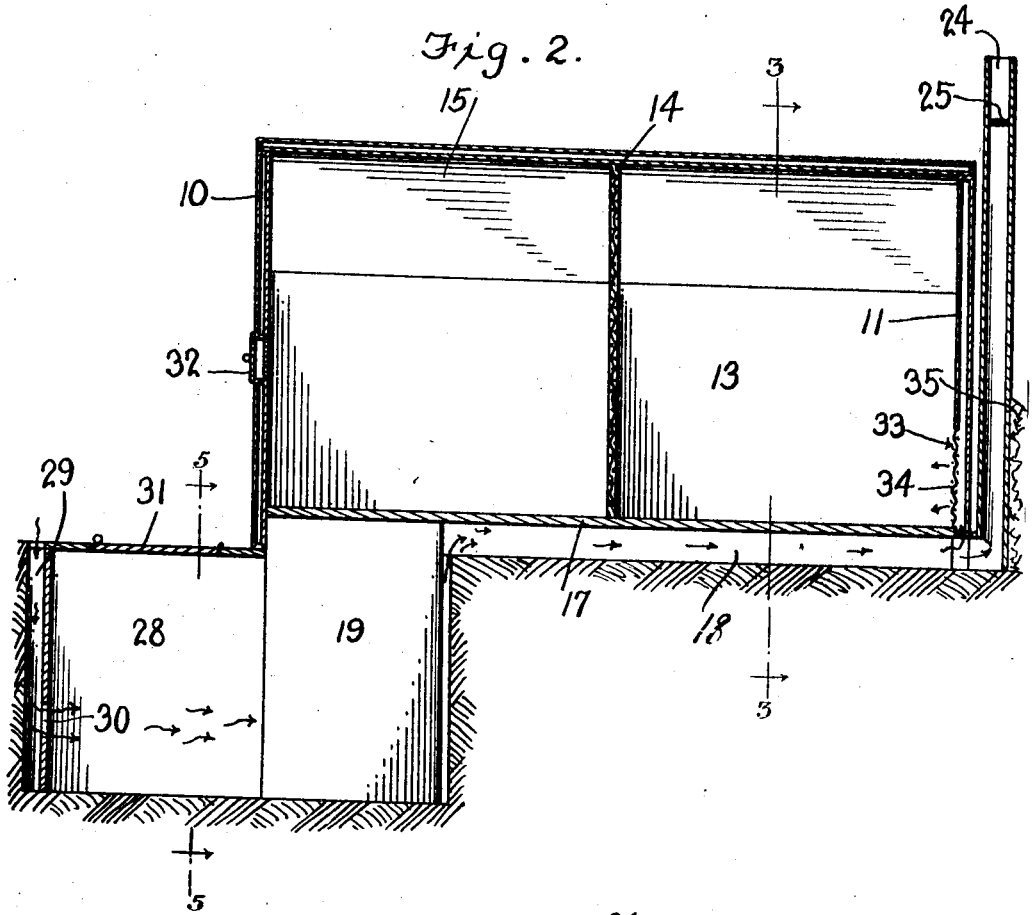
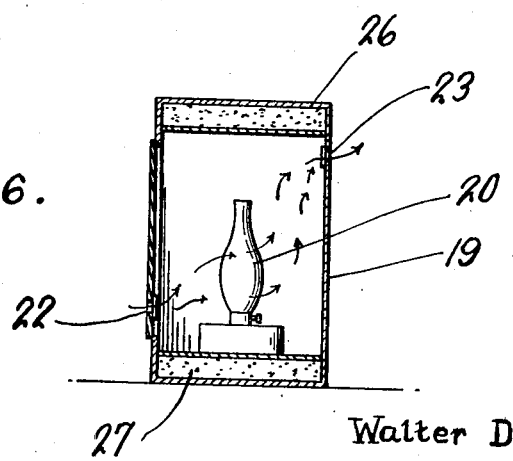
Inventor
Walter D. Insko
Witnesses
L. B. James
By Victor J. Evans
Attorney

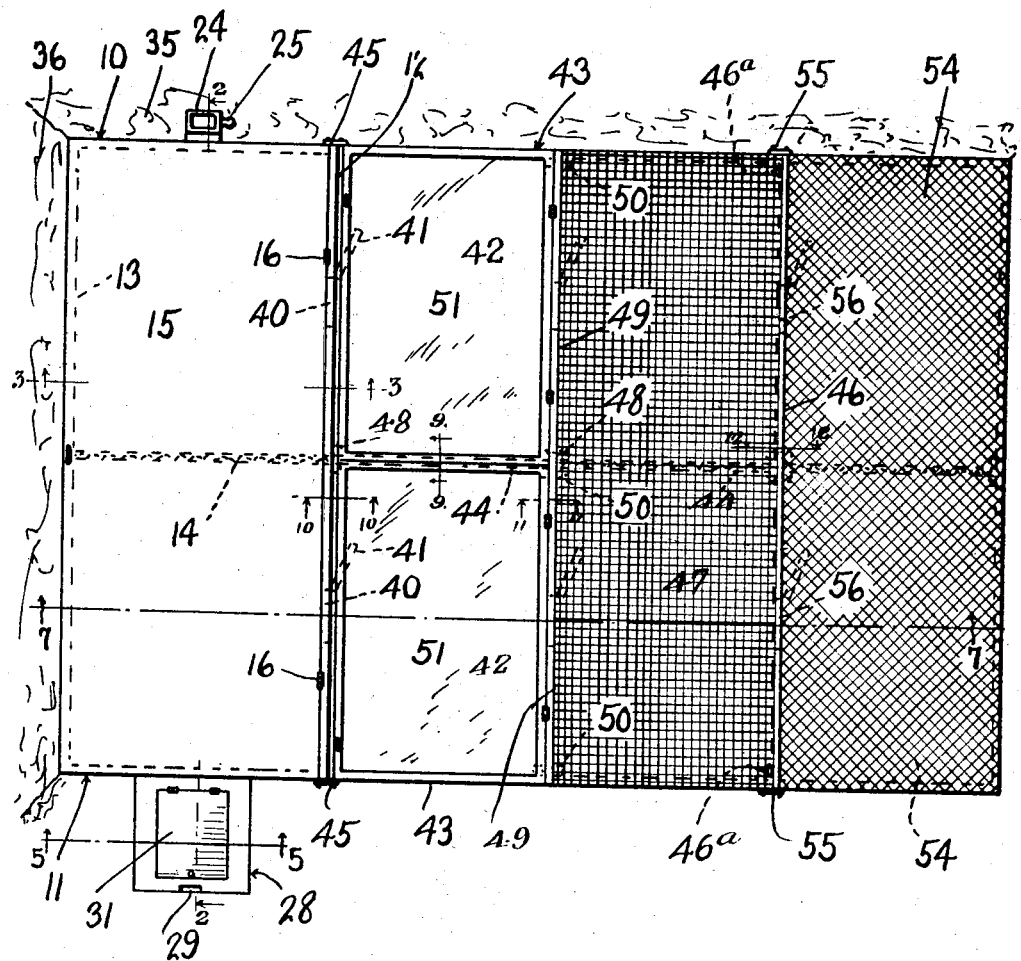

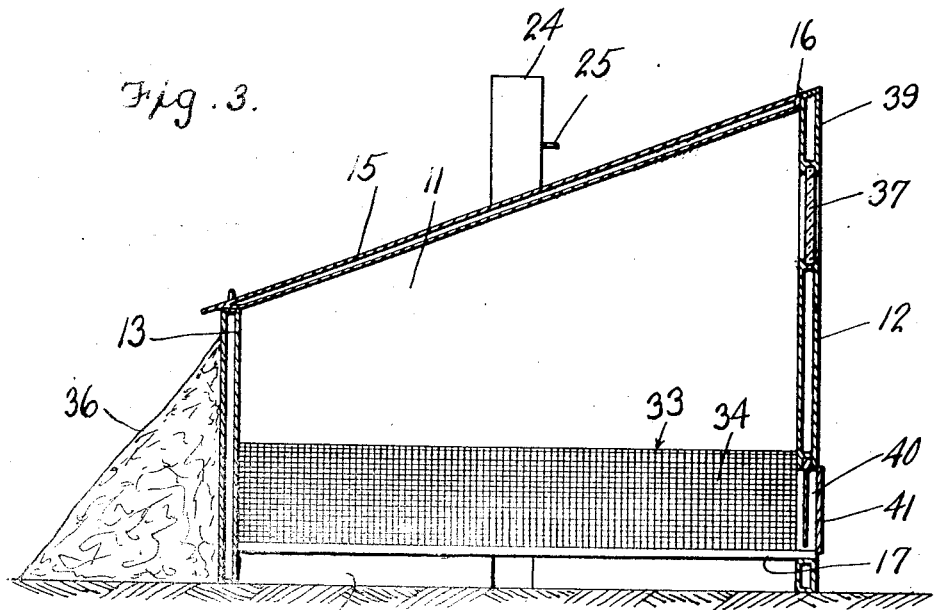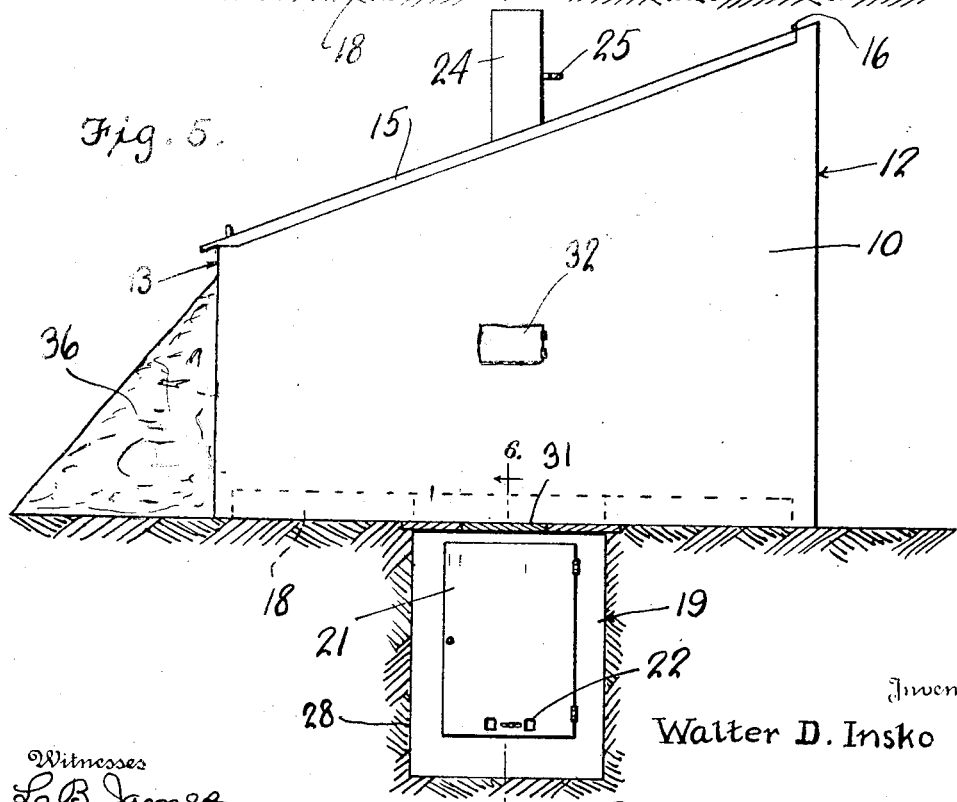

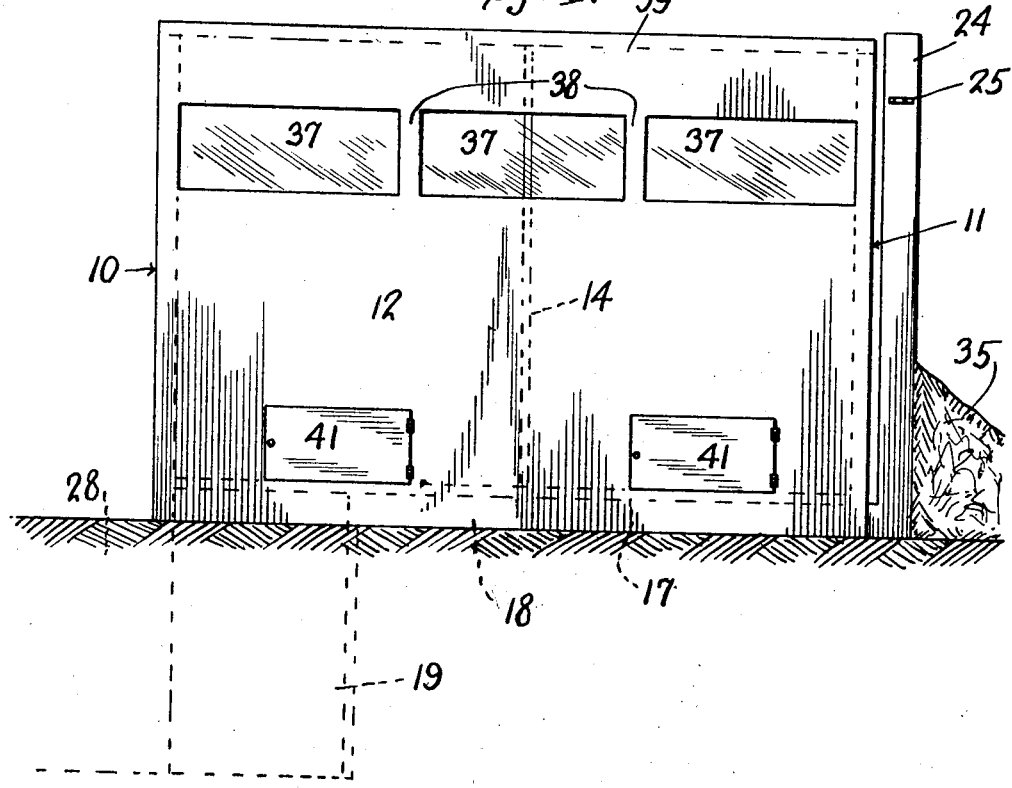
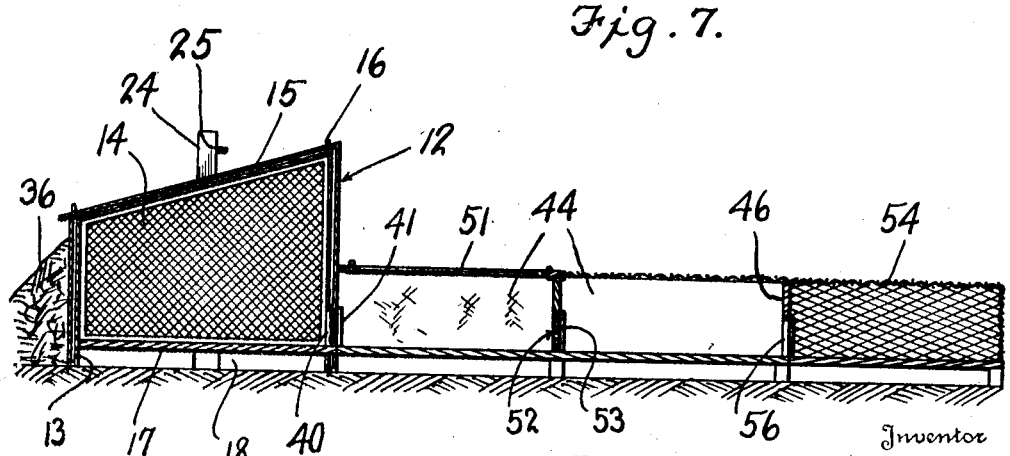

W. D. INSKO.
BROODER.
APPLICATION FILED OCT. 17, 1919.
1,350,971.
Patented Aug. 24, 1920.
5 SHEETS—SHEET 5.
Fig. 9.
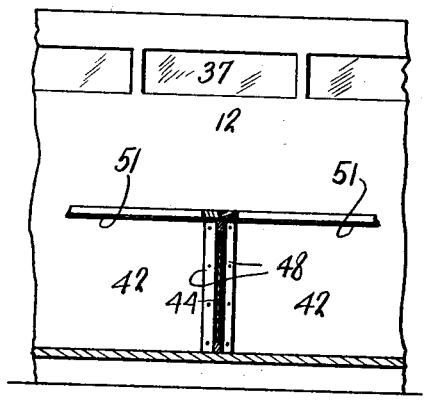
Fig. 10.
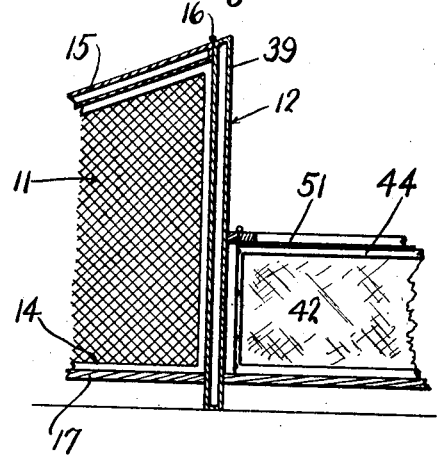
Fig. 11.
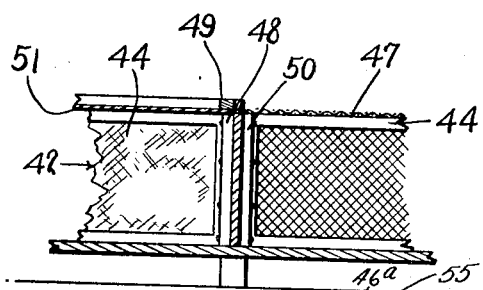
Fig. 12.
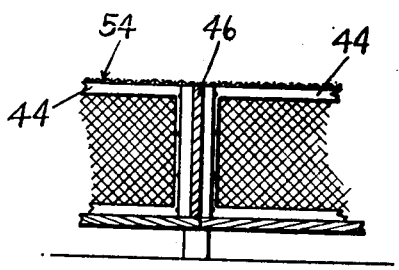
Fig. 8.
WITNESS:
L. B. James
Walter D. Insko
INVENTOR
BY Victor J. Evans
ATTORNEY

UNITED STATES PATENT OFFICE.

WALTER D. INSKO, OF ANSELMO, NEBRASKA.

BROODER.

1,350,971.          Specification of Letters Patent.        Patented Aug. 24, 1920.

Application filed October 17, 1919. Serial No. 331,383.

*To all whom it may concern:*

Be it known that I, WALTER D. INSKO, a citizen of the United States, residing at Anselmo, in the county of Custer and State of Nebraska, have invented new and useful Improvements in Brooders, of which the following is a specification.

The object of the invention is to provide a simple, relatively inexpensive and efficient brooder designed to be used out of doors or independently of any other building or structure as distinguished from devices which are recognized as indoor brooders, wherein the proper temperature is maintained by means of the heat from a lamp or other equivalent heating medium, and wherein proper and expedient means are provided for protecting the brood while permitting the same to have an amount of freedom for exercise, etc.; which is conducive to the proper development of poultry; and furthermore to provide means whereby a number of broods which should be kept separate from each other may be accommodated in a single structure which may be modified readily to suit the conditions and the circumstances under which it may be employed.

With these and other objects and advantages in view, as will appear in the course of the following description, of a preferred embodiment of the invention, the same consists of a construction, combination and arrangement of parts herein specifically set forth, it being understood that changes in form, proportion and details may be resorted to within the scope of the appended claims, without departing from the principles involved.

In the drawings:

Figure 1 is a plan view of a complete structure embodying the invention.

Fig. 2 is a longitudinal sectional view of the brooder house proper, on the plane indicated by the line 2—2 of Fig. 1.

Fig. 3 is a transverse vertical sectional view on the plane indicated by the line 3—3 of Fig. 1 and Fig. 2.

Fig. 4 is a front elevation of the brooder house proper.

Fig. 5 is a front end view or an elevation of that end of the brooder house at which the heating device is located, and showing in section the air inlet pit on the plane indicated by the line 5—5 of Figs. 1 and 2.

Fig. 6 is a vertical section through the heating chamber on the plane indicated by the line 6—6 of Fig. 5.

Fig. 7 is a section on the plane indicated on the line 7—7 of Fig. 1 to show the relation between the outlet of the brooder house and the feeding, exercise and exposure pens which are in communication therewith.

Fig. 8 is a plan view partly in section of the pens.

Figs. 9, 10, 11 and 12 are detail sections on planes indicated respectively by lines 9—9, 10—10, 11—11 and 12—12 of Fig. 1.

The brooder house represents an inclosure having double walls forming dead air spaces as a heat nonconducting medium, and comprises essentially the front and rear end walls 10 and 11 and the front and rear side walls 12 and 13, any desired number of intermediate open work, wire screen or other ventilating partitions 14 being arranged therein to divide the interiors into compartments, and a cover 15 being hinged to the upper edge of the front side wall as shown at 16 and disposed at a water shedding inclination, the raising of this cover being designed to give access to the interiors of the compartments. The structure which is provided with a floor 17 is adapted to be arranged upon or close to the ground under such conditions as to provide thereunder a longitudinally extending heat flue 18, and communicating with this heat flue at the front end of the brooder house is a heating chamber 19, also having double walls and bottom and designed to contain the lamp 20 or similar equivalent heating apparatus, the front or outer wall of said chamber being fitted with a hinged door 21 having an air inlet register 22 and the opposite wall thereof being provided with an outlet register 23 communicating with the heat flue 18 and adapted to permit the circulation of heated air from the said chamber to the flue from whence it passes throughout the length of the brooder house to the outlet stack 24 having a regulating damper 25. Heat nonconducting fenders 26 and 27 having fillings of water or sand or the equivalent thereof are preferably arranged at the top and the bottom of the heat chamber as shown particularly in Fig. 6.

In front of the heat chamber there is preferably located a pit 28 in order to give access to the door of said chamber for introducing and adjusting the heating apparatus, and said pit is provided as shown with an air inlet flue 29 through which air may enter to supply the heating device, said air entering the body of the pit through a suitable opening or draining 30 and the pit preferably being provided with a movable trap door 31. In the front end wall of the brooder house is arranged an inspection opening 32 fitted with glass or other transparent filler so that the condition of the interior of the structure may be seen without raising the cover 15.

Also at the rear end wall of the brooder chamber, and in communication with the flue 18 is a heat inlet passage 33 separated from the interior of the chamber by means of a grating or wire netting as shown at 34. The soil or manure may be banked up against the rear end and rear side walls of the structure as shown at 35 and 36. Also in the front side wall of the brooder house there are preferably arranged light admitting panels 37 separated by spring pieces or uprights 38 which serve to support the ridge 39 to which the door or cover 15 of the house is hinged.

Formed in the front side wall of the brooder house, one for each compartment into which the interior is divided by the partitions 14 are formed the outlet or door openings 40 fitted with hinged or other movable doors 41 to provide for communication with the feeding pens 42 of which the longitudinal outer walls 43 and intermediate walls 44 are secured to the front wall of the brooder house by detachable fastenings such as the hooks 45 and the remote extremities of said walls are connected by an end wall 46 hinged thereto as shown at 46ª, so that said outer side and end or cross walls 43 and 46 may be folded into compact form when the pens are not in use. The intermediate wall 44 separating the corresponding feeding pens 42 and the exercising pens 47, may be detachably fitted in seats formed by cleats 48 on the facing surfaces of said wall 46 and the front side wall of the brooder house. In the same way the partition walls 49 by which the feeder pens 42 are separated from the exercising pens 47, may be terminally fitted in guides formed by the cleats 50 on said intermediate wall 44 and the side walls 43. These separating walls 49 preferably carry covers 51 for the feeding pens which are hinged to the said wall so as to give access to the interiors of the feeding pens. In the transverse walls 49 separating the feeding and exercising pens there are formed outlet openings 52 preferably covered by flexible screens 53 which while serving to exclude draft permit of the ready passage of the chicks from one pen to the other.

Connected with the outer walls 46 of the exercising pens, which may be as shown open at the top are the sunlight pens 54 of which the walls may be constructed of screen or other openwork material secured in place by means of the attaching hooks 55, and in the walls 46 there are formed openings 56 also having flexible screens or curtains for the purpose indicated with reference to the screens 53. It will be noted that the elements of the pen structure may be readily detached from the brooder house and folded and stored in a small amount of space when use is not required.

It will also be noted that the pens which are in communication with the outlets of the compartments of the brooder house proper are arranged in sets or series, each set comprising the removably covered feeding pen, the communicating exercising pen and the communicating open or sunlight pen so as to give a sufficient freedom of movement to the brood while affording ample protection therefor and ready access to the brooder house where the temperature may be maintained at such a degree as to insure the proper development of the poultry.

What is claimed is:—

1. A brooder having a compartmental house provided with a heating apparatus, and sets of communicating pens respectively in communication with the compartments of said house, and comprising hingedly connected side and end walls, of which the former are detachably connected with the walls of the said house, an intermediate wall detachably engaged with guides on the house wall and the end pen wall, and transverse division walls between the pens of each set removably engaged with guides on the side and intermediate walls and carrying hinged covers for the pens adjacent to the brooder house.

2. A brooder having a compartmental house provided with a heating apparatus, and sets of communicating pens in communication respectively with the compartments of said house, and comprising side walls detachably connected with the brooder house, and hingedly connected to a transverse end wall, intermediate longitudinal and transverse walls detachably connected with said side and end walls, the transverse intermediate walls carrying covers for the pens adjacent to the brooder house, and additional pens respectively in communication with the terminal pens of said sets and consisting of openwork walls detachably connected with the end wall of each set.

In testimony whereof I affix my signature.

WALTER D. INSKO.